United States Patent
Fujimori et al.

(10) Patent No.: US 7,634,646 B2
(45) Date of Patent: Dec. 15, 2009

(54) NETWORK TERMINAL DEVICE, DELIVERY SERVER AND CLIENT/SERVER SYSTEM

(75) Inventors: Kenichi Fujimori, Tokyo (JP); Jun Haishima, Tokyo (JP)

(73) Assignee: Aruze Corporation, Koto-ku, Tokyo (JP)

( * ) Notice: Subject to any disclaimer, the term of this patent is extended or adjusted under 35 U.S.C. 154(b) by 828 days.

(21) Appl. No.: 11/232,233

(22) Filed: Sep. 22, 2005

(65) Prior Publication Data

US 2006/0150239 A1 Jul. 6, 2006

(30) Foreign Application Priority Data

Sep. 28, 2004 (JP) .............................. 2004-282029

(51) Int. Cl.
*G06F 9/00* (2006.01)
(52) U.S. Cl. ................. 713/1; 710/8; 710/10; 710/104; 709/220; 709/221; 709/222
(58) Field of Classification Search ..................... 713/1; 710/8, 10, 104; 717/174–178; 709/220–222
See application file for complete search history.

(56) References Cited

U.S. PATENT DOCUMENTS

| | | | | |
|---|---|---|---|---|
| 5,748,893 | A * | 5/1998 | Hirata et al. ................. | 709/200 |
| 5,935,242 | A * | 8/1999 | Madany et al. .................. | 713/1 |
| 2002/0138592 | A1* | 9/2002 | Toft ............................. | 709/219 |
| 2003/0163680 | A1* | 8/2003 | Wang et al. ..................... | 713/1 |
| 2003/0208675 | A1* | 11/2003 | Burokas et al. ................. | 713/1 |

FOREIGN PATENT DOCUMENTS

| | | |
|---|---|---|
| CN | 1517899 A | 8/2004 |
| EP | 1 431 935 A1 | 12/2003 |
| JP | 11-288393 | 10/1999 |
| JP | 2004-73266 | 3/2004 |

(Continued)

OTHER PUBLICATIONS

Computer Dictionary (Bryan Pfaffenberger, "Webster's New World Dictionayr of Computer Terms", 7th edition, 1999).*

(Continued)

*Primary Examiner*—Kambiz Zand
*Assistant Examiner*—Peter Poltorak
(74) *Attorney, Agent, or Firm*—McGinn IP Law Group, PLLC

(57) ABSTRACT

To provide a technique of allowing a terminal device to operate by downloading not only an application program but also an OS from a network without providing any special unit or equipment. A system includes: an OS delivery server that has OS data previously stored therein; an application delivery server that has application data previously stored therein; an intra-LAN server that receives the OS data from the OS delivery server and stores the OS data, activates the OS data as the OS of its own, and receives the application data from the application delivery server and stores the application data; and a network terminal device that is capable of receiving the OS data and the application data from the intra-LAN delivery server, activating the OS data as the OS of its own, and activating an application contained in the application data on the OS.

4 Claims, 9 Drawing Sheets

FOREIGN PATENT DOCUMENTS

| | | |
|---|---|---|
| JP | 2006-034708 | 2/2006 |
| WO | WO 00/52570 | 9/2000 |
| WO | WO 02/78806 A1 | 10/2002 |
| WO | WO 03/90109 A1 | 10/2003 |
| WO | WO 03/91894 A1 | 11/2003 |

OTHER PUBLICATIONS

Macau Search Report dated Nov. 6, 2007 with English Translation.
Eurasian Search Report dated Feb. 26, 2006.
European Search Report dated Jan. 5, 2006.

* cited by examiner

NETWORK TERMINAL DEVICE, DELIVERY SERVER AND CLIENT/SERVER SYSTEM

The present disclosure relates to subject matters contained in Japanese Patent Application No. 2004-282029 filed on Sep. 28, 2004, which are expressly incorporated herein by reference in its entireties.

BACKGROUND OF THE INVENTION

1. Field of the Invention

The present invention relates to a network terminal device, a delivery server, and a client/server system. In particular, the present invention relates to a network terminal device that has neither an operating system (OS) nor application data previously installed therein but acquires an operating system and application data via a network to run them, a delivery server used therefor, and a client/server system used therefor.

2. Description of the Related Art

With recent development of the communications technology and recent spread of network infrastructures, it has become possible to download, via a network, an application running on an operating system (OS) (that is, a program running on an OS, referred to as application program hereinafter) or data used by the application program (referred to collectively as application data hereinafter) to a general-purpose information processor, such as a personal computer (PC), or a terminal device, such as an arcade video game machine designed for networking.

According to a conventional method, application data is downloaded from a network file server (NFS) retaining the application data to a plurality of terminal devices via a network to update application data in the terminal devices to a new version or replace application data in the terminal devices with another application program, thereby always keeping the terminal devices installed with the latest program. Such a method is disclosed in Japanese Patent Laid-Open No. 2004-73266.

SUMMARY OF THE INVENTION

In order to download an application program, a terminal device uses a network communication function of an OS. Therefore, the terminal device has to have a local storage device that retains the OS previously stored therein, for example, a read only memory (ROM).

However, if the OS is stored in the ROM, the OS cannot be updated or replaced with another OS. Thus, there is a problem that, if an inconvenience or insufficiency occurs in the OS, it cannot be eliminated by downloading.

An object of the present invention is to provide a technique of allowing a terminal device to operate by downloading not only an application program but also an OS from a network without providing any special unit or equipment.

In order to attain the object described above, the present invention is characterized as described below.

According to a first aspect of the present invention, there is provided a network terminal device.

The network terminal device comprises: network connecting means for connecting to a communication network (a communication control board, for example); temporary storage means (a temporary storage device, such as a RAM, for example); and program executing means that executes a program stored in the temporary storage means (a CPU, for example), in which the network connecting means downloads an OS and an application via the communication network and stores the OS and the application in the temporary storage means, and the program executing means activates the OS stored in the temporary storage means and activates and runs the application on the OS.

The network terminal device can execute an application on a predetermined OS using only a RAM mounted thereon, without the need of using a ROM storing the OS previously written thereto.

According to a second aspect of the present invention, there is provided a delivery server.

The delivery server is a server (an intra-LAN delivery server, for example) intended for providing an OS and an application to the network terminal device according to the first aspect, for example. The delivery server comprises: first communication control means (a subnet-side communication control unit) for connecting to a first communication network (a subnet, for example); OS storage means (an OS data storage unit) for storing an OS downloaded by the first communication control means; application storage means (an application data storage unit) for storing an application downloaded by the first communication control means; and second communication control means (a LAN-side communication control unit) for connecting to a second communication network (a LAN, for example), in which the second communication control means transmits the stored OS and application to the second communication network in response to a request for the OS and application transmitted via the second communication network.

With the delivery server, there can be provided an environment in which the delivery server can accomplish delivery of an application running on a predetermined OS using only a RAM mounted thereon, without the need of using a ROM storing the OS previously written thereto.

According to a third aspect of the present invention, there is provided a client/server system.

The system comprises: a first delivery server (an OS delivery server) that has OS data previously stored therein; a second delivery server (an application delivery server) that has application data previously stored therein; a third delivery server (an intra-LAN server) that receives the OS data from the first delivery server and stores the OS data, activates the OS data as the OS of its own, and receives the application data from the second delivery server and stores the application data; and a network terminal device that is capable of receiving the OS data and the application data from the third delivery server, activating the OS data as the OS of its own, and activating an application contained in the application data on the OS.

With the system, if only an OS and an application are previously prepared in the first and second delivery servers, respectively, a plurality of network terminal devices can execute the application on the OS, without the need of previously installing the OS and the application in the third delivery server located in each shop or in the network terminal devices connected to the third delivery server via the LAN.

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE PREFERRED EMBODIMENTS

In the following, with reference to the drawings, embodiments of the present invention will be described in detail.

1. Client/Server System According to Embodiment

As an embodiment of the present invention, a client/server system, which can provide application data to a network terminal device via a network, will be described.

[1.1. Example of System Configuration]

Figure 1:
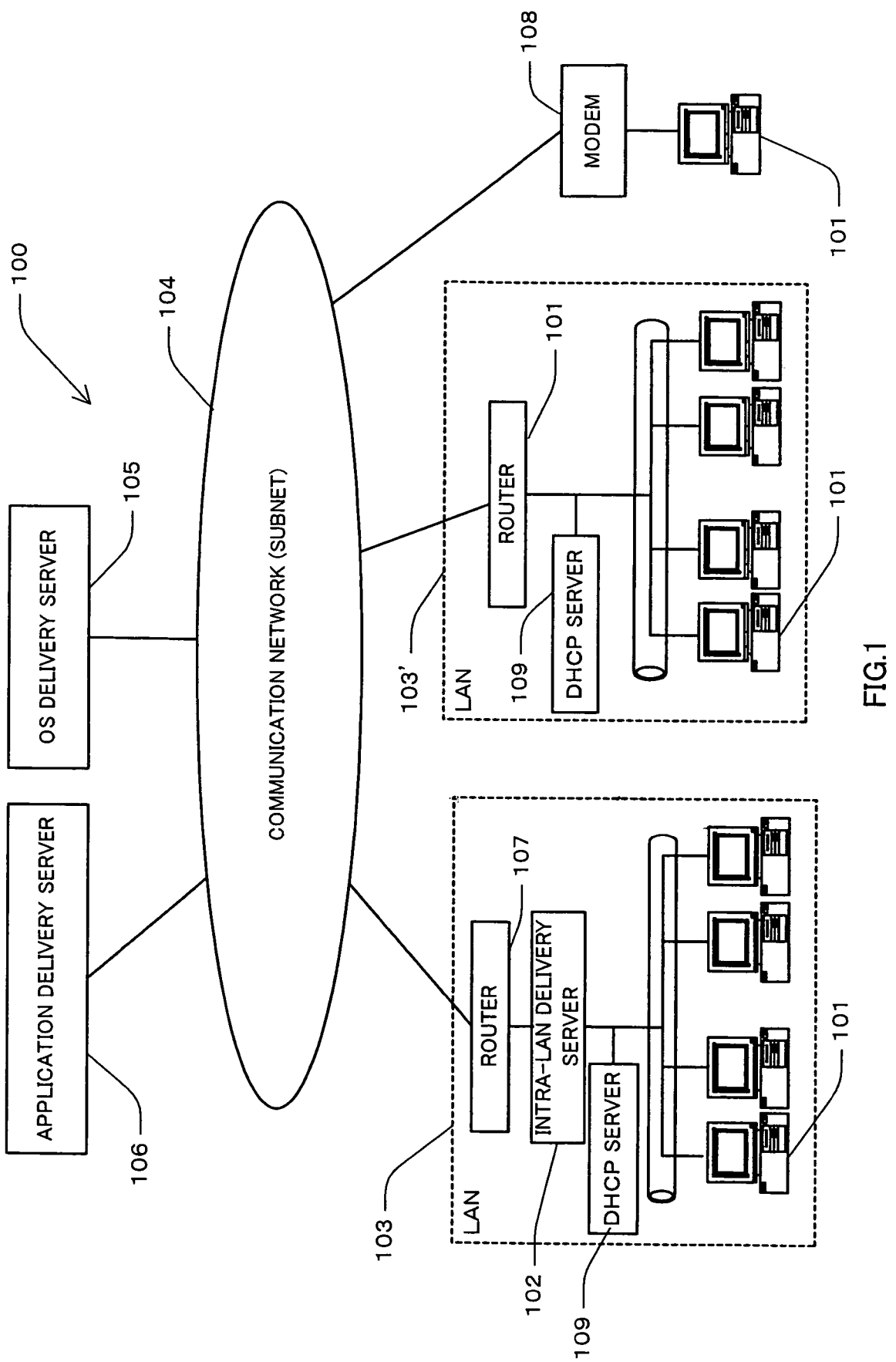
FIG. 1 shows a configuration of a client/server system.

FIG. 1 shows a configuration of the client/server system according to this embodiment of the present invention. In the following, a configuration of a game system will be described with reference to FIG. 1.

In a client/server system 100, a client does not have any OS and application data previously stored in a RAM or the like, and when booted up, the client can acquire an OS and application data from a server and run the application.

The client/server system 100 comprises a network terminal device 101, a LAN 103 including an intra-LAN delivery server 102 capable of communicating with the network terminal device 101, an OS delivery server 105 capable of communicating with the intra-LAN delivery server 102 via a communication network (a subnet) 104 linked to the LAN 103, and an application delivery server 106. The LAN 103 is linked to the communication network 104 via a router 107.

In the following, components of the client/server system 100 will be described.

[1.1.1. Communication Network]

The communication network (subnet) 104, which may be of a cable type or a wireless type and may be of a dedicated-line type or a switched-line type, permits a device connected thereto to exchange information with an intended device. The communication network 104 may be a combination of a plurality of subnetworks linked to each other via a gateway, like the Internet. In addition, connection to the communication network may be a temporary connection according to the point-to-point protocol (PPP) or the like, rather than a direct connection to a trunk, referred to as backbone. It is essential only that, once a session is established, the parties involved in the session can exchange information between them. Here, the "communication network" described above includes a communication network including no switch or router, such as a fixed network of dedicated lines.

[1.1.2. OS Delivery Server]

The OS delivery server 105 has data constituting an OS (kernel, init or the like if the OS is UNIX (trademark), for example) stored in local storage means and functions as a device that transmits the OS to the intra-LAN delivery server 102 or the network terminal device 101 via the communication network 104 and the router 107 or the like in response to a request from the intra-LAN delivery server 102.

Each OS delivery server 105 is an information processor that can communicate with another device via the communication network 104. For example, the OS delivery server 105 may be a computer or workstation that has a web connecting capability. The information processor constituting the OS delivery server 105 comprises a central processing unit (CPU), an input/output (I/O) interface and a main memory (RAM), and, if needed, an optional external storage device, such as a read-only memory (ROM) and a hard disk drive.

Figure 2:
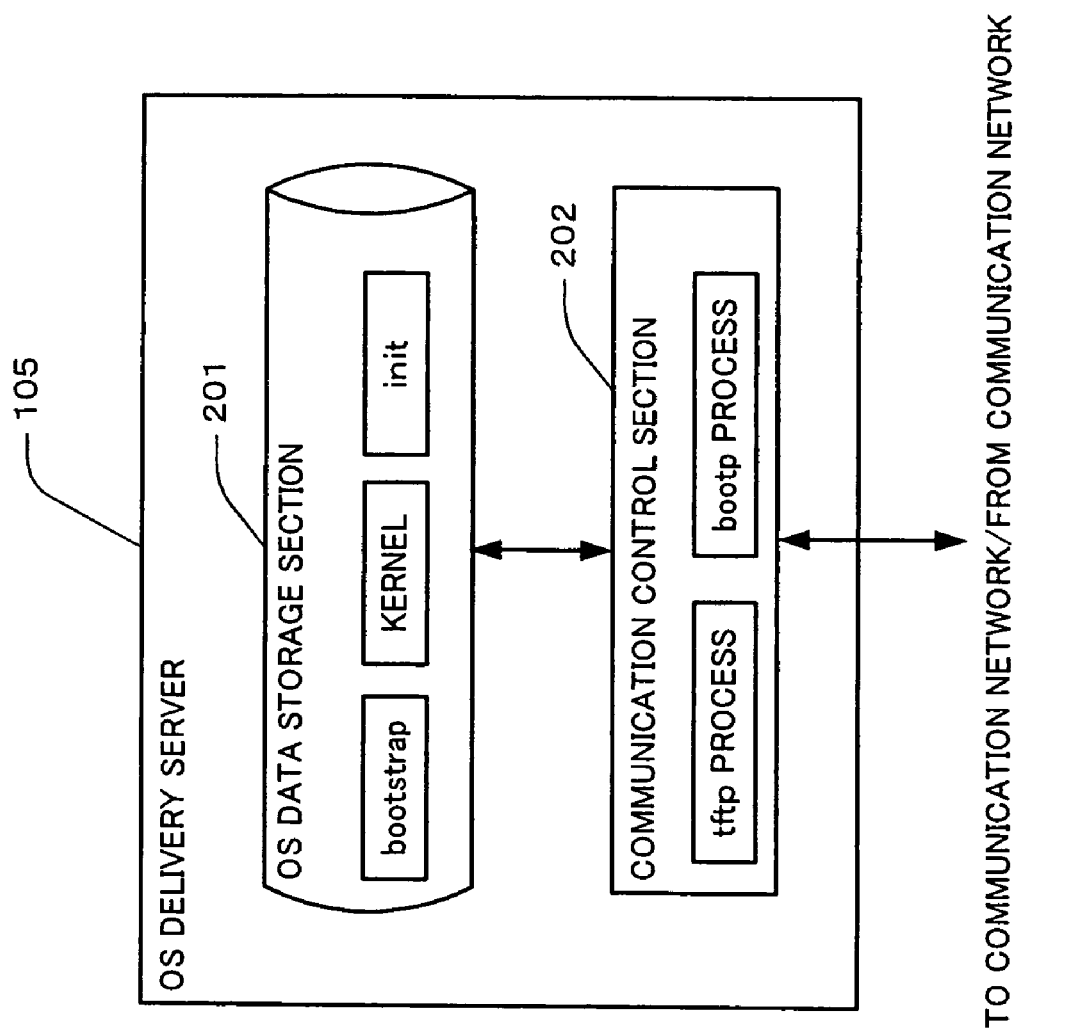
FIG. 2 is a functional block diagram showing a configuration of an OS delivery server.

FIG. 2 is a functional block diagram showing a configuration of the OS delivery server 105.

The OS delivery server 105 comprises an OS data storage unit 201 that stores OS data that describes processes (kernel, for example) of an OS and a communication control unit 202 that reads the OS data from the OS data storage unit 201 in response to a request from a client, such as the intra-LAN delivery server 102 and the network terminal device 101, and transmits the OS data via the communication network 104. The communication control unit 202 may be constituted by hardware or software that performs a process for implementing TFTP, a process for implementing BOOTP or the like.

[1.1.3. Application Delivery Server]

Referring to FIG. 1 again, the application delivery server 106 will be described.

The application delivery server 106 has application data stored in local storage means and transmits the application data to the intra-LAN delivery server 102 or the network terminal device 101 via the communication network 104 and the router 107 or the like in response to a request from the intra-LAN delivery server 102 or the network terminal device 101.

The application delivery server 106 is an information processor that can communicate with another device via the communication network 104. For example, the application delivery server 106 may be a computer or workstation that has a web connecting capability. The information processor constituting the application delivery server 106 comprises a central processing unit (CPU), an input/output (I/O) interface and a main memory (RAM), and, if needed, an optional external storage device, such as a read-only memory (ROM) and a hard disk drive.

Figure 3:
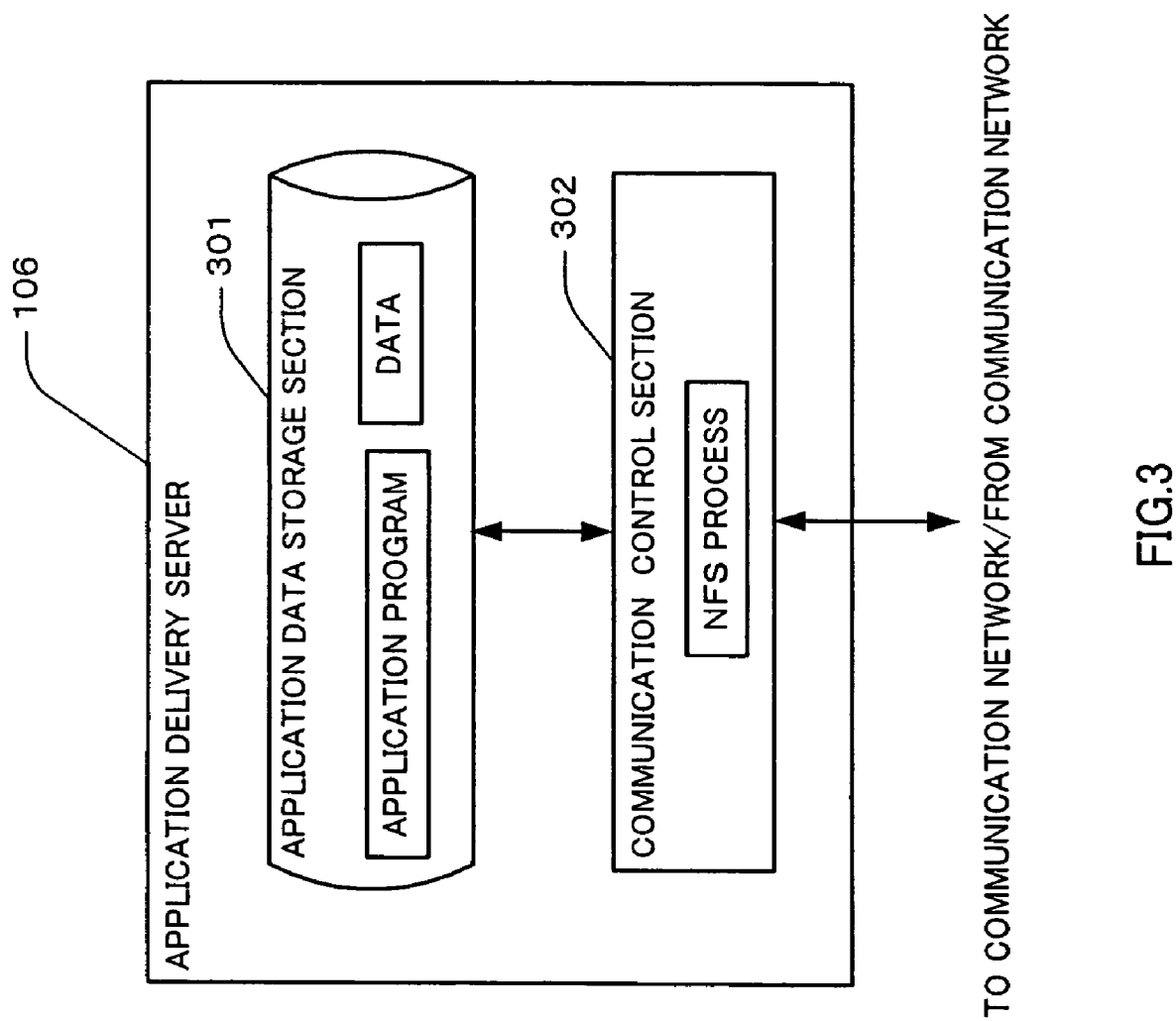
FIG. 3 is a functional block diagram showing a configuration of an application delivery server.

FIG. 3 is a functional block diagram showing a configuration of the application delivery server 106.

The application delivery server 106 comprises an application data storage unit 301 that stores an application program and data used by the application program and a communication control unit 302 that reads the application data from the application data storage unit 301 in response to a request from a client, such as the intra-LAN delivery server 102 and the network terminal device 101, and transmits the application data via the communication network 104. The application data stored in the application data storage unit 301 is prepared by an administrator or operator of the application delivery server 106 previously writing to the storage means. The communication control unit 302 may be constituted by hardware or software that performs a network file system (NFS) process or the like.

The "application" described herein may be any program, process or method or any combination thereof that runs on the OS and may be designed for any purpose, such as for business purpose or for amusement purpose. In addition, the application is intended to operate on the network terminal device 101 and not to operate on the application delivery server 106 or the intra-LAN delivery server 102 described later.

In addition, the "application" may operate independently of the network terminal device 101 on which the application operates (in the case where the application is game software not designed for networking, for example) or may operate in association with the network terminal device 101 or another device (such as another network terminal device 101 and another server device) (in the case where the application is online match game software, for example).

The OS delivery server 105 and the application delivery server 106 may be physically separate devices or may be constituted by one device installed with a program for implementing the OS delivery server 105 and a program for implementing the application delivery server 106.

[1.1.4. Intra-LAN Delivery Server]

Referring to FIG. 1 again, the intra-LAN delivery server 102 will be described.

Once booted up, the intra-LAN delivery server 102 downloads an OS and application data from the OS delivery server 105 and the application delivery server 106, respectively, and permits the network terminal device 101 in the LAN 103 to download the OS and application data in response to a request from the network terminal device 101. That is, the intra-LAN delivery server 102 doubles as a server that provides the OS and application data to each network terminal device 101 in response to a request therefrom and a client that downloads the OS and application data from the OS delivery server 105 and the application delivery server 106, respectively.

Each intra-LAN delivery server 102 is an information processor that can communicate with the OS delivery server 105 and the application delivery server 106 via the communication network 104 and with each network terminal device 101 in the LAN 103. For example, the intra-LAN delivery server 102 may be a computer or workstation that has a network connecting capability. The information processor constituting the intra-LAN delivery server 102 comprises a central processing unit (CPU), an input/output (I/O) interface and a readable and rewritable storage device (RAM), and an optional external storage device, such as a hard disk drive.

Figure 4:
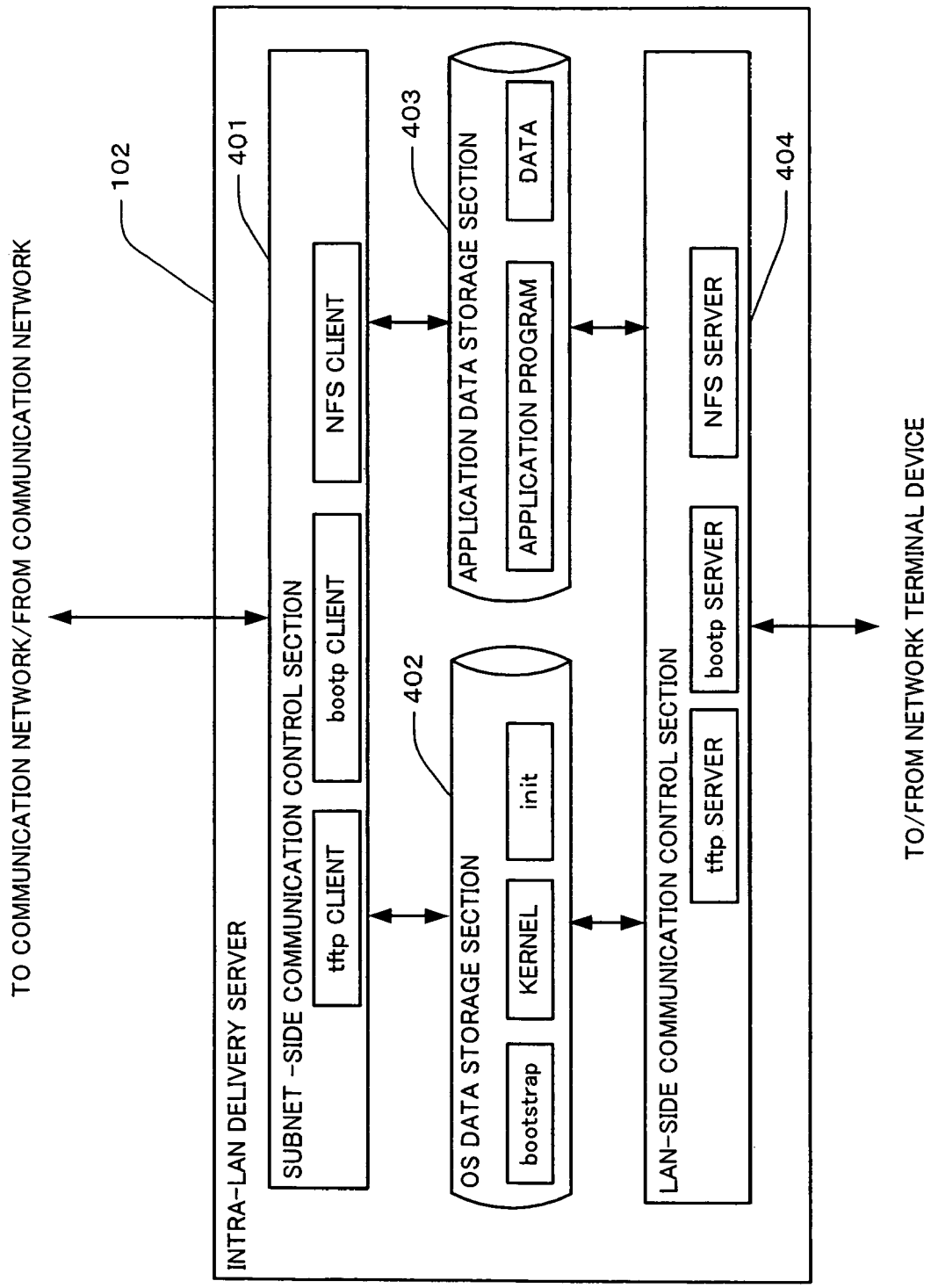
FIG. 4 is a functional block diagram showing a configuration of an intra-LAN delivery server.

FIG. 4 is a functional block diagram showing a configuration of the intra-LAN delivery server 102.

The intra-LAN delivery server 102 comprises a subnet-side communication control unit 401, an OS data storage unit 402, an application data storage unit 403 and a LAN-side communication control unit 404.

The subnet-side communication control unit 401 communicates with the OS delivery server 105 and the application delivery server 106 via the communication network 104 to receive the OS and application data, and passes the OS and application data to the OS data storage unit 402 and the application data storage unit 403, respectively, for storage. The subnet-side communication control unit 401 may be constituted by hardware or software that performs a server-side process, such as a TFTP process, a BOOTP process and an NFS process.

The OS data storage unit 402 stores OS data that describes processes (kernel, for example) of the OS.

The application data storage unit 403 stores application program and application data that is used by the application program.

The LAN-side communication control unit 404 reads the OS data and application data from the OS data storage unit 402 and the application data storage unit 403, respectively, in response to a request from a client network terminal device 101 and transmits the read data to each network terminal device 101 interconnected in the LAN. The LAN-side communication control unit 404 may be constituted by hardware or software that performs a client-side process, such as a TFTP process, a BOOTP process and an NFS process.

[1.1.5. Network Terminal Device]

Referring to FIG. 1 again, the network terminal device 101 will be described.

The network terminal device 101 does not permanently store any OS or application data, but acquires an OS and application data from the OS delivery server 105 and the application delivery server 106 or from the intra-LAN delivery server 102 to run the OS and the application as required (when the network terminal device 101 is powered on and booted up, for example). That is, the network terminal device 101 is characterized in that the network terminal device 101 has neither OS nor application data stored in its local storage device and downloads and activates an OS and application data to permit a user to use the application running on the OS only when necessary.

The network terminal device 101 is an information processor that can access the intra-LAN delivery server 102, or the OS delivery server 105 and the application delivery server 106. For example, the network terminal device 101 may be a cellular phone, a computer, a workstation, a home video game machine, an arcade video game machine, a mobile communication terminal or a personal digital assistant (PDA) that has a network connecting capability. The information processor constituting the network terminal device 101 comprises a readable and rewritable storage device (RAM, for example) and an optional external storage device, such as a hard disk drive.

Figure 5:
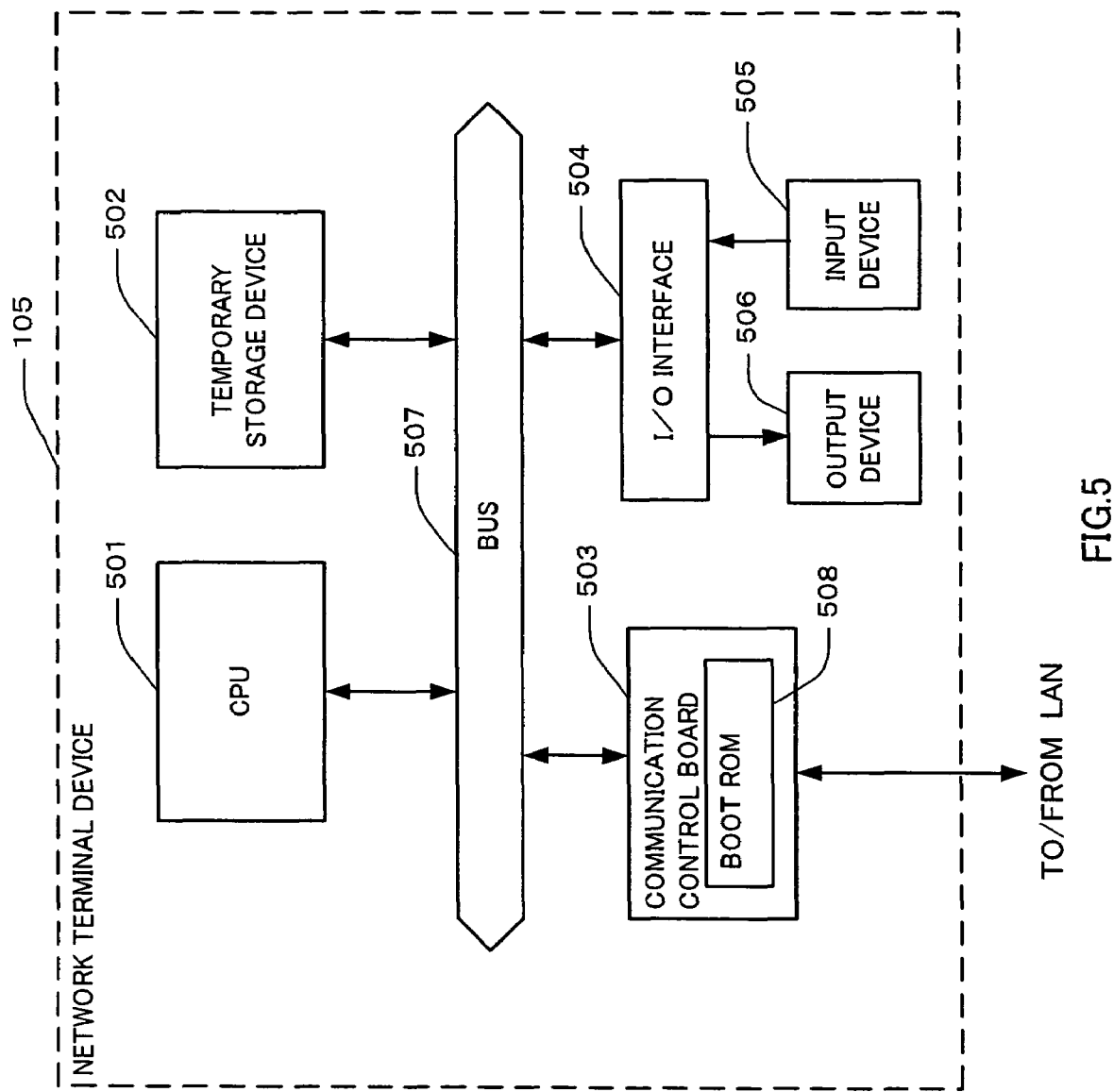
FIG. 5 is a block diagram showing a configuration of a network terminal device.

FIG. 5 shows a configuration of the network terminal device 101. The network terminal device 101 comprises a central processing unit (CPU) 501, a storage device 502 that does not permanently store an OS and application data (referred to as temporary storage device), a communication control board 503 for achieving data communication with the LAN 103, an I/O interface 504, an input device 505 (a control panel, a keyboard or the like) and an output device 506 (a monitor, a display or the like) that are connected to the I/O interface 504, and a bus 507 used for data exchange between the components described above.

For example, the communication control board 503 is a network interface card (NIC), such as the Ethernet (registered trademark) card, on which a boot ROM 508 is mounted. The boot ROM 508 stores a program that describes a procedure to be performed before an OS is activated in the network terminal device 101, or in other words, a procedure for downloading an OS. Once the network terminal device 101 is booted up, the CPU 501 performs the procedure described in the program stored in the boot ROM 508 to download OS data and stores the OS data in the temporary storage device 502. Then, the CPU activates the downloaded OS, downloads an application program, stores the application program in the temporary storage device 502, and then activates the application program to make the application executable. The user can use the application through manipulations of the network terminal device 101.

[1.1.6. Modification of LAN]

While the LAN 103 described above has the intra-LAN delivery server 102, the client/server system 100 according to this embodiment may include a LAN that has no intra-LAN delivery server 102. As shown by a LAN 103' in FIG. 1, the network terminal device 101 may download the OS and application data directly from the OS delivery server 105 and the application delivery server 106, respectively, via the communication network 104.

Furthermore, the network terminal device 101 may not be always included in a LAN. For example, the network terminal in the client/server system 100 according to this embodiment may be a network terminal device 101 that connects to the communication network 104 via a modem 108.

[1.2. Example of System Operation]

Figure 6:
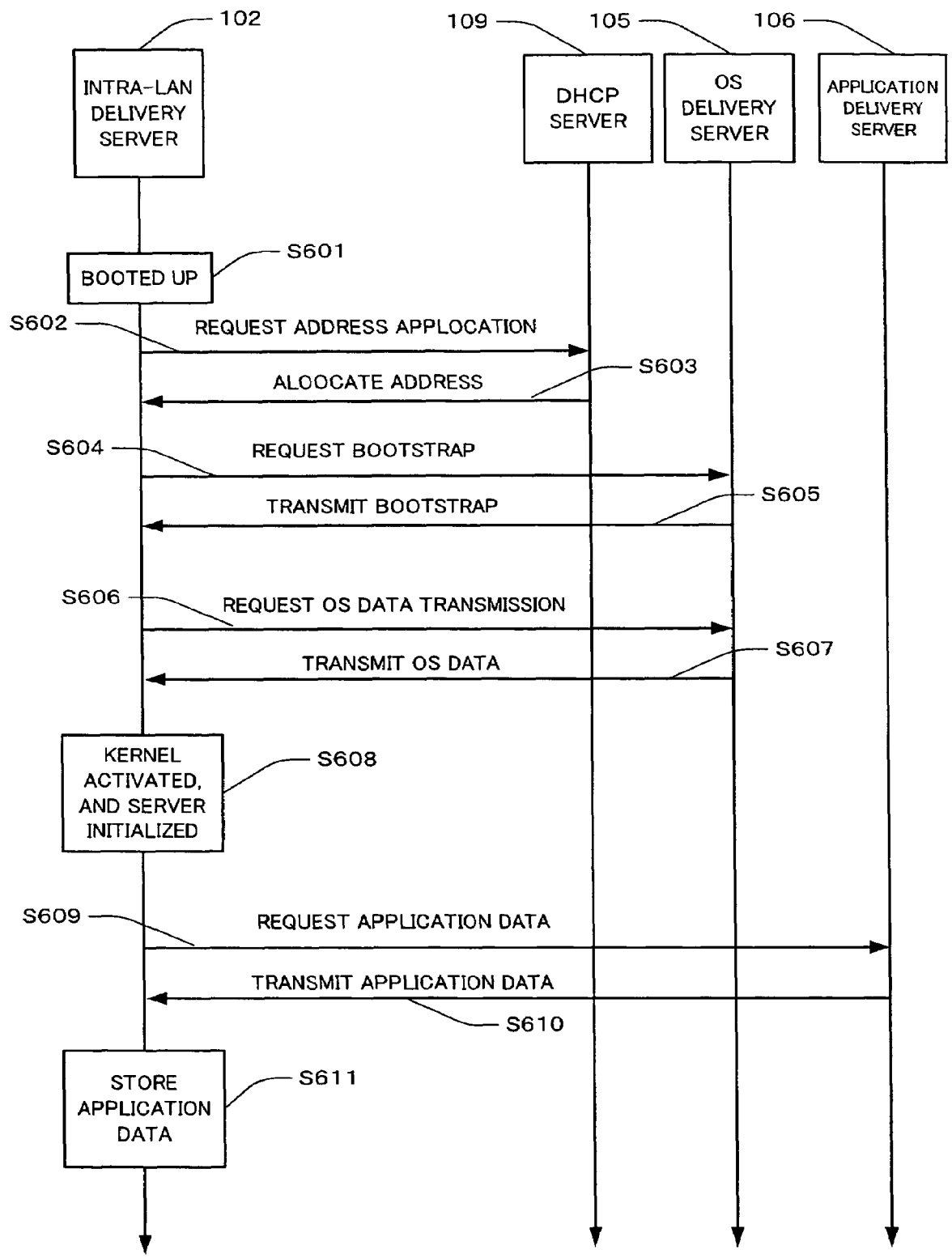
FIG. 6 is a diagram showing an operational sequence in which the intra-LAN delivery server downloads and stores OS data and application data.
Figure 7:
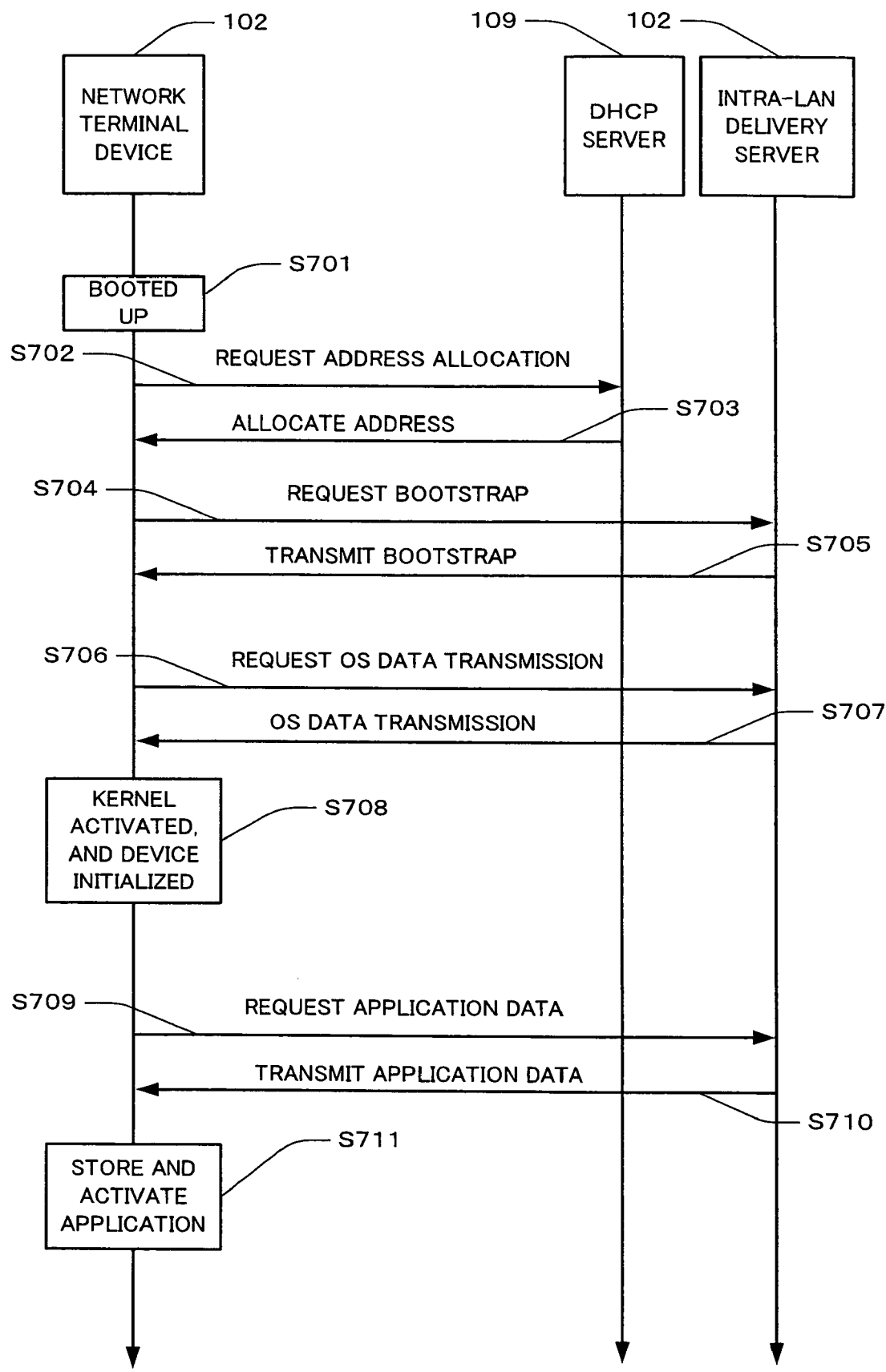
FIG. 7 is a diagram showing an operational sequence in which the network terminal device downloads and stores OS data and application data.

Now, an operation of the system according to this embodiment will be described with reference to FIGS. 6 and 7. FIG. 6 shows an operational sequence in which the intra-LAN delivery server 102 downloads and stores an OS and application data from the OS delivery server 105 and the application delivery server 106, respectively, when the Intra-LAN delivery server 102 is powered on and booted up. FIG. 7 shows an operational sequence in which the network terminal device 101 downloads an OS and application data from the intra-LAN delivery server 102, which has completed download of the OS and application data, and activates the OS and application data when the network terminal device 101 is powered on and booted up.

[1.2.1. Download by Intra-LAN Delivery Server 102]

First, a download operation carried out by the intra-LAN delivery server 102 will be described.

The intra-LAN delivery server 102 is booted up by a power supply or the like (S601). At this point in time, no OS or application data is installed in the intra-LAN delivery server 102.

Once the intra-LAN delivery server 102 is booted up, the subnet-side communication control unit 401 in the intra-LAN delivery server 102 requests allocation of an IP address from a DHCP server 109 (S602), and the DHCP server 109 informs the intra-LAN delivery server 102 of an IP address allocated to the intra-LAN delivery server 102 (S603).

Then, the intra-LAN delivery server 102 requests transmission of a bootstrap or an initial program loader (IPL) from the OS delivery server 105 according to TFTP, BOOTP or the like (S604). The OS delivery server 105 transmits a bootstrap stored in the OS data storage unit 201 to the intra-LAN delivery server 102 according to the same protocol, TFTP, BOOTP or the like (S605).

The intra-LAN delivery server 102 executes the bootstrap transmitted from the OS delivery server 105. The bootstrap describes a path for OS data (kernel or the like if the OS is UNIX, for example) stored in the OS delivery server 105 and a procedure for transferring or mounting the OS data to the intra-LAN delivery server 102.

Once the bootstrap is executed, the intra-LAN delivery server 102 requests transfer of an OS data file from the OS delivery server 105 according to TFTP, for example (S606) In response to the request, the OS delivery server 105 transmits the OS data stored in the OS data storage unit 201 to the intra-LAN delivery server 102 via the communication network 104 (S607).

Once receiving the OS data, the intra-LAN delivery server 102 stores the OS data in the OS data storage unit 402 to prepare for a transmission request from the network terminal device 101 and activates the OS using the OS data (S608). That is, once the OS data is completely stored, the bootstrap described above implements a procedure for reading in and activating the stored OS data. For example, if the OS is UNIX, the bootstrap activates the kernel, and the kernel performs initialization of hardware (initialization of a device driver) and swap and dump configurations and then performs the init process, which is the first process. By executing the init process, various commands for initializing the system, such as a file check command, amount command and a daemon activation command are executed, and the activation of the OS is completed.

In addition, the init describes a procedure for downloading application data from the application delivery server 106 and storing the application data in the application data storage unit 403. By executing the init, the intra-LAN delivery server 102 requests transmission of application data from the application delivery server 106 (S609). For example, the init describes a procedure for executing an NFS client process, and the intra-LAN delivery server 102 may request mounting of an application data file system from the application delivery server 106 through the NFS client process. In response to the request, the application delivery server 106 transmits the application data to the intra-LAN delivery server 102 (S610).

Once receiving the application data, the intra-ALN delivery server 102 stores the application data in the application data storage unit 403 to prepare for a transmission request from the network terminal device 101. In addition, the intra-LAN delivery server 102 activates the LAN-side communication control unit 404 to prepare for a transmission request from the network terminal device 101. For example, as an activation process for the LAN-side communication control unit 404, processes of a TFTP server, a BOOTP server and an NFS server are activated to prepare for such a request.

Then, activation of the intra-LAN delivery server 102 is completed, and the intra-LAN delivery server 102 is in a standby state in which the intra-LAN delivery server 102 waits for a transmission request from the network terminal device 101.

[1.2.2. Download to Network Terminal Device 101]

Now, a download operation from the intra-LAN delivery server 102 to the network terminal device 101 will be described with reference to FIG. 7.

First, the network terminal device 101 is booted up by power-on or the like (S701). At this point in time, no OS or application data is installed in the network terminal device 101.

Once the network terminal device 101 is booted up, the communication control board 503 in the network terminal device 101 requests allocation of an IP address from the DHCP server 109 (S702), and the DHCP server 109 informs the network terminal device 101 of an IP address allocated to the network terminal device 101 (S703).

Then, the network terminal device 101 requests transmission of a bootstrap or an initial program loader (IPL) from the intra-LAN delivery server 102 according to TFTP, BOOTP or the like (S704). The intra-LAN delivery server 102 transmits a bootstrap stored in the OS data storage unit 402 to the network terminal device 101 according to the same protocol, TFTP, BOOTP or the like (S705).

The network terminal device 101 executes the bootstrap transmitted from the intra-LAN delivery server 102. The bootstrap describes a path for OS data (kernel or the like if the OS is UNIX, for example) stored in the intra-LAN delivery server 102 and a procedure for transferring or mounting the OS data to the intra-LAN delivery server 102.

Once the bootstrap is executed, the network terminal device 101 requests transfer of an OS data file from the intra-LAN delivery server 102 according to TFTP, for example (S706). In response to the request, the intra-LAN delivery server 102 transmits the OS data stored in the OS data storage unit 402 to the network terminal device 101 (S707).

Once receiving the OS data, the network terminal device 101 stores the OS data in the temporary storage device 502 and starts activation of the OS (S708). That is, once the OS data is completely stored, the bootstrap described above implements a procedure for reading in and activating the stored OS data. For example, if the OS is UNIX, the bootstrap activates the kernel, and the kernel performs initialization of hardware (initialization of a device driver) and swap and dump configurations and then performs the init process, which is the first process. By executing the init process, various commands for initializing the system, such as a file check command, a mount command and a daemon activation command, and the activation of the OS is completed.

In addition, the init describes a procedure for downloading application data from the intra-LAN delivery server 102, storing the application data in the temporary storage device 502, and activating the application. By continuing execution of the init, the network terminal device 101 requests transmission of application data from the intra-LAN delivery server 102 (S709). For example, the init describes a procedure for executing an NFS client process, and the network terminal device 101 may request mounting of an application data file system from the intra-LAN delivery server 102 through the NFS client process. In response to the request, the intra-LAN delivery server 102 transmits the application data to the network terminal device 101 (S710).

Once receiving the application data, the network terminal device 101 stores the application data in the temporary storage device 502.

In addition, the network terminal device 101 invokes the stored application data to run the application (S711). Thus, the network terminal device 101 can activate the OS and the application running on the OS.

Through such an operation of the system according to this embodiment, the user of the network terminal device 101, which has not been previously installed with any OS or application, becomes capable of using the application running on the OS.

[1.2.3. Others]

As described above, in the system according to this embodiment, the network terminal device 101 may directly request the OS delivery server 105 and the application delivery server 106 to transmit an OS and application data, respectively. In such a case, except that the OS delivery server 105 and the application delivery server 106 have to be described, as transmission request destinations, in the boot ROM 508 of the network terminal device 101, the procedure shown in FIG. 6 can be used as it is.

EXAMPLES

2. Game System

Figure 8:
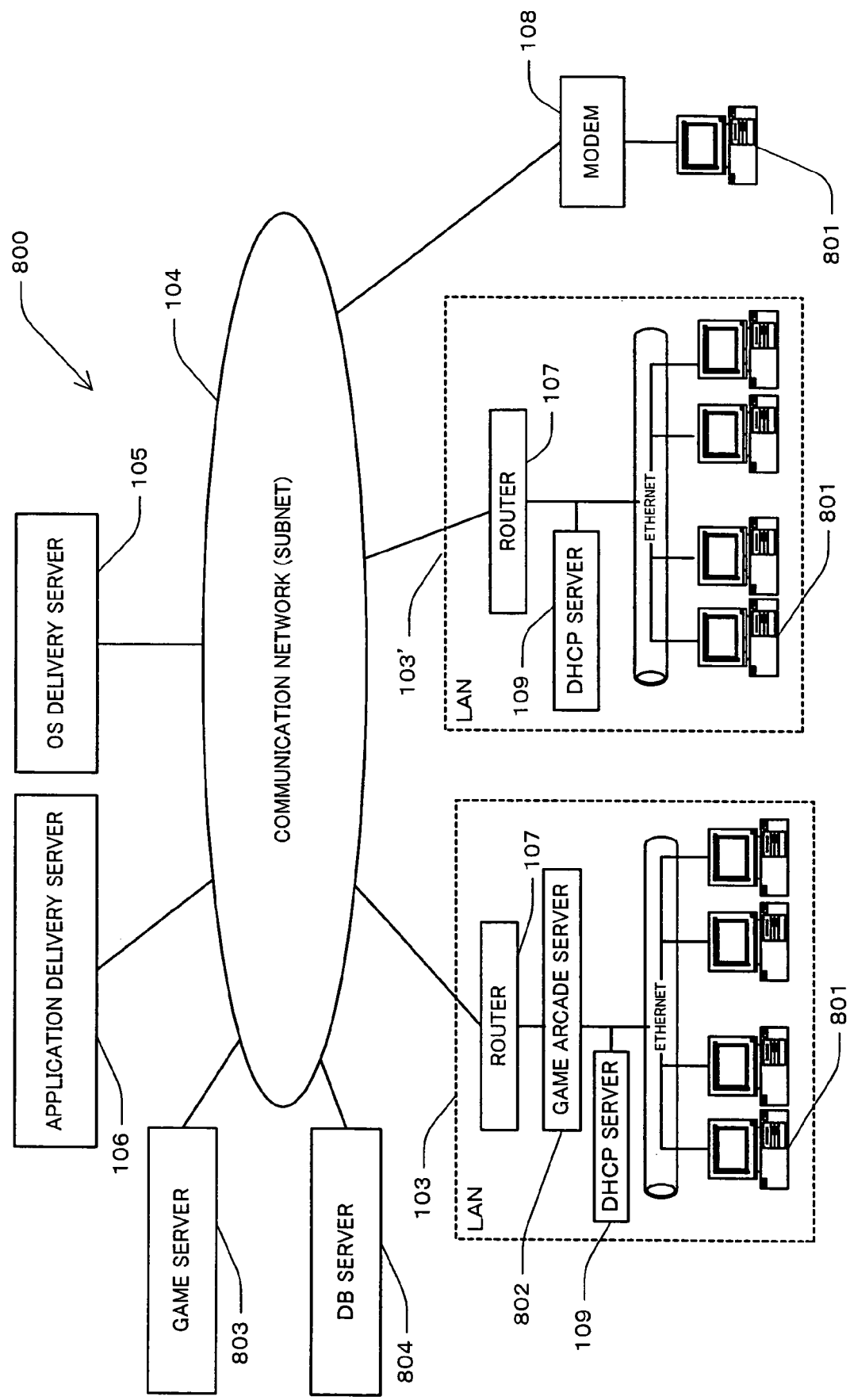
FIG. 8 shows a configuration of a game system.

Now, a game system, which is a practical example of the client/server system described above, will be described. The client/server system 100 described above can be used as a game system, in which the network terminal device 101 functions as a game machine. FIG. 8 shows a configuration of the game system.

A game system 800 is a system that provides an online match game for a player. For example, with the game system 800, a player α using a game machine 801 located in a game arcade A and a player β using a game machine 801 located in another game arcade B distant from the game arcade A can play together with the same game.

[2.1. Example of Configuration of Game System]

The game system 800 comprises: a LAN 103 including a game machine 801, which functions as a network terminal device 101 in the client/server system 100, and a game arcade server 802 that can communicate with the game machine 801, which functions as an intra-LAN delivery server 102; an OS delivery server 105 and an application delivery server 106 that can communicate with the game arcade server 802 via a communication network (subnet) 104 linked to the LAN 103; and a game server 803 and a database server 804 that are connected to the communication network 104.

The game system 800 is the same as the client/server system 100 described above, except that the game server 803 and the database server 804 are additionally provided, and the game machine 801 functions as the network terminal device 101. In the description of the game system 800, the intra-LAN delivery server 102 in the client/server system 100 is referred to as game arcade server 802. However, the configuration, function and operation of the game arcade server 802 are the same as those of the intra-LAN delivery server 102.

The game server 803 performs a matchmaking process and, if a match is arranged, performs a data transfer process between game machines involved in the match. The matchmaking process is a process of determining whether there is any player who wants to participate in a game in which a player has just participated and arranging a match between the players if it is determined that there is a player who wants to participate in the game. If there is found no other players who want to participate in the game in which a player has participated, the CPU of the game server or the CPU of the relevant game arcade server 802 may play the role of an opponent in the game.

The database server 804 has a capability of transmitting data involved in the game to the game machine 801. For example, the "data involved in the game" includes an ID for identifying a player, and player-specific parameters (power, speed, hit point or the like) concerning a character, a trading card or a figure used in the game by the player.

As the player experiences many matches, the player-specific parameter concerning the character, the trading card or the figure is recalculated according to a predetermined formula, and the resulting new parameter is stored in the database server 804. As a result, as the player experiences many matches, the parameter concerning the character or the like increases, and thus, the player can feel as if the character used by the player grows.

In the game system 800, the game machine 801 is used as the network terminal device 101. The game machine 801 has a configuration similar to that of a satellite 1 disclosed in Japanese Patent Application No. 2004-188822 filed on Jun. 25, 2004 by the present applicant.

Figure 9:
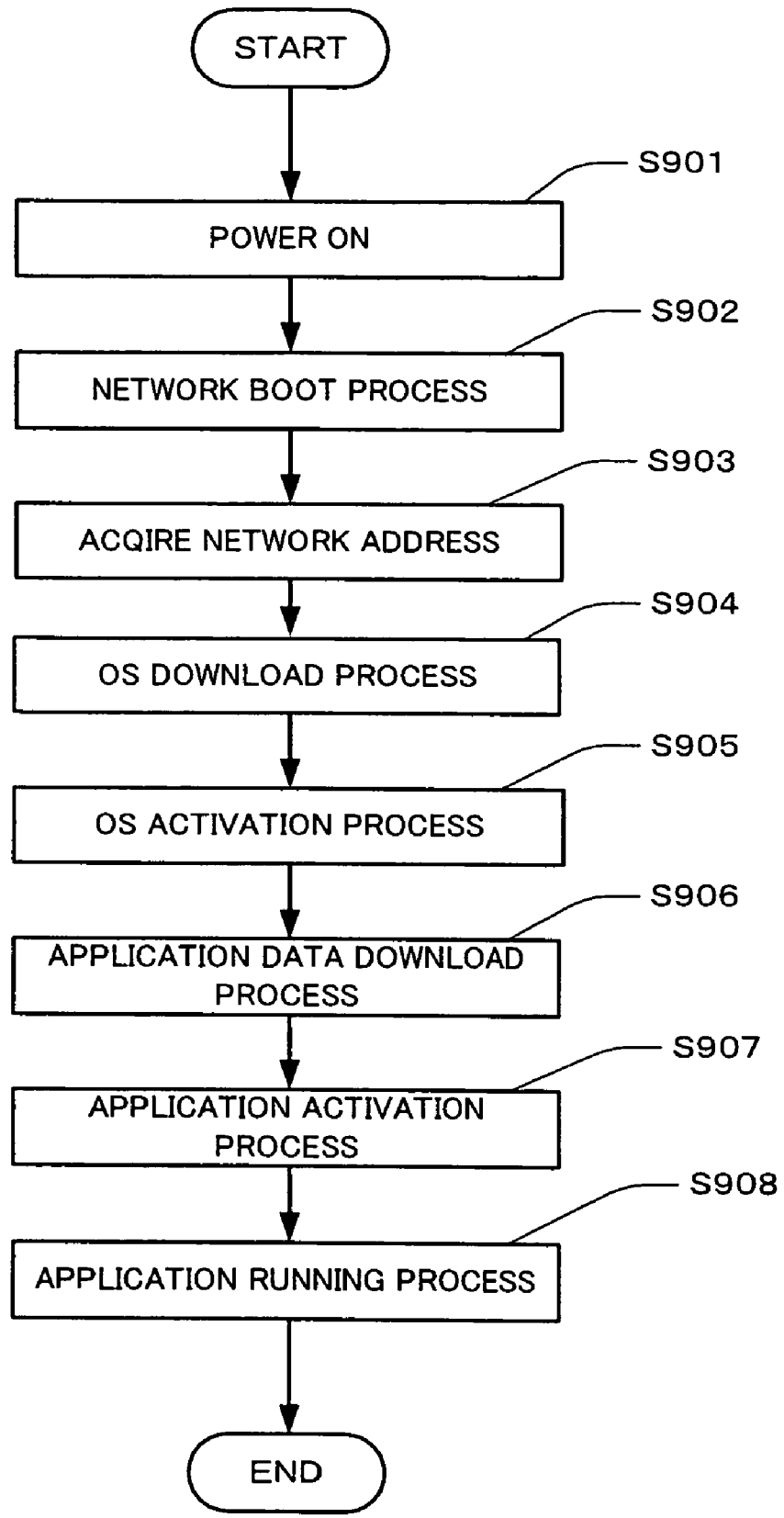
FIG. 9 is a flowchart showing a download process carried out by the game system.

The game machine 801 performs a download process when the game machine 801 is powered on. FIG. 9 shows a download process performed by the game machine 801.

First, the game machine 801 is powered on (S901). At this point in time, the game machine 801 is not installed with any OS or application data.

Once the game machine 801 is booted up, a network interface card in the game machine 801 starts operating and performs a network boot process (S902).

The network boot process is a process to establish a network connection. As a part of the network boot process, the game machine 801 requests allocation of an IP address from a DHCP server 109, and the DHCP server 109 informs the game machine 801 of an IP address allocated to the game machine 801. In this way, the game machine 801 acquires a network address (S903), and from this point in time, the game machine 801 can communicate with the game arcade server 802, which is another network device in the LAN.

Then, the game machine 801 requests transmission of a bootstrap from the game arcade server 802 and, then, requests transmission of the kernel from the game arcade server 802. Once the game arcade server 802 transmits the bootstrap and the kernel in response to the requests, the game machine 801 receives them and performs an OS download process (S904).

Then, the game machine 801 activates the OS stored in a temporary storage device 502 (S905).

Specifically, if the OS is UNIX, the bootstrap activates the kernel, and the kernel performs initialization of hardware (initialization of a device driver) and swap and dump configurations and then performs the init process, which is the first process. By executing the init process, various commands for initializing the system, such as a file check command, a mount command and a daemon activation command are executed, and the activation of the OS is completed. Of course, according to the present invention, an OS other than UNIX, such as LINUX and WINDOWS (trademark of Microsoft Corporation), can be equally used.

In addition, the init describes a procedure of downloading application data from the game arcade server 802, storing the application data in the temporary storage device 502 and activating the application. By continuing execution of the init, the game machine 801 performs an application data downloading process for receiving application data from the game arcade server 802 and storing the application data in the temporary storage device 502 (S906).

Furthermore, the game machine 801 invokes the stored application data to perform an application activation process (S907). Once the application activated, the game machine 801 performs an application process (S908). That is, the game machine 801 can permit a user to play the game. The game machine first waits for an entry input of a player, and if an entry is made by a player, the game machine 801 requests the game server 803 to perform the matchmaking process for determining an opponent of the player and starts the game. Then, the game machine performs a series of game processes, such as start of the battle and decision on the battle.

3. Others (1) The number of programs contained in the application data is not necessarily one, and the application program may contain a plurality of programs, including a program for performing a game process and a program for a manipulator designed for the game machine 801.

(2) In the above description, it is supposed that, when stating download of an OS, an IP address is acquired from the DHCP server 109. However, in the case of using an IP address in an environment where an IP address can be previously set, such as in Ipv6, an IP address can be previously written in the boot ROM 508 or the like, and the IP address can be used rather than acquiring from the DHCP server 109.

(3) The temporary storage device 502 can be any type of storage device that is remotely writable. For example, a semiconductor storage device, such as a RAM (DRAM, SRAM or the like) or a magneto-resistance memory, such as a magnetoresistive random access memory (MRAM), may be used. In addition, the temporary storage device 502 may be a volatile memory or a nonvolatile memory. According to the present invention, a rewritable storage medium, such as a hard disk drive, a DVD and a CD, can be equally used as the temporary storage device 502.

4. Advantage of the Invention

According to the present invention, application data can be newly acquired for use by using a RAM or other storage means, rather than using a ROM installed with an OS.

In addition, since the OS and application data to be used are not stored in the ROM, the OS and application data can be remotely updated. Thus, the number of persons and the time required for updating the OS and application data. In addition, since the need of any physical replacement is eliminated, the failure rate can also be reduced.

Additional advantages and modifications will readily occur to those skilled in the art. Therefore, the invention in its broader aspects is not limited to the specific details or representative embodiments shown and described herein. Accordingly, various modifications may be made without departing from the spirit or scope of the general inventive concept as defined by the appended claims and their equivalents.

What is claimed is:

1. A client/server system, comprising:
a first delivery server that has an Operating System data previously stored therein;
a second delivery server;
a third delivery server that has an application data previously stored therein; and
a network terminal device;
wherein said second delivery server is adapted to:
  request a transmission and receive the Operating System data from said first delivery server, store the Operating System data, and activate the Operating System data as the Operating System of its own;
  request a transmission of the application data from said third delivery server upon activation of the Operating System, receive the requested application data, and store the requested application data; and
  transmit the Operating System and the application data to the network terminal device in response to a request from the network terminal device;
wherein the network terminal device comprises:
  a temporary storage section;
  a network connecting section for connecting to a communication network, wherein said network connecting section are adapted to download an Operating System and an application from the second delivery server via the communication network, and to store the Operating System and the application in the temporary storage section; and
  program executing section adapted to execute a program stored in the temporary storage section, to activate the Operating System stored in the temporary storage section, and to activate and run the application on the Operating System.

2. A delivery server, comprising:
a first communication control unit for connecting to a first communication network and downloading an Operating System from a first server;
an Operating System storage unit for storing Operating System data downloaded by the first communication control unit; and
a second communication control unit for connecting to a second communication network,
wherein said first communication control unit is adapted to download an application data from a second server upon activation of the Operating System,
wherein the delivery server further comprises an application storage unit for storing the application data downloaded by the first communication control unit,
wherein said second communication control unit is adapted to transmit said stored Operating System and said application data to a network terminal device in response to a request for the Operating System and for said application data from the network terminal device via the second communication network, and
wherein the network terminal device is adapted to request a transmission and receive the Operating System data from the delivery server, store the Operating System data, and activate the Operating System data as the Operating System of its own.

3. A method for controlling a client/server system, comprising:
- requesting a transmission of an Operating System data from a first delivery server to a second delivery server, storing the transmitted Operating System data in the second delivery server, and activating the Operating System data as the Operating System of its own;
- requesting the transmission of a application data from a third delivery server to the second delivery server upon activation of the Operating System in the second delivery server, and storing the transmitted application data at the second delivery server;
- transmitting the Operating System data requested by the network terminal device from the second delivery server to a network terminal device in response to a request from the network terminal device for the transmission of the Operating System data;
- storing the Operating System data in a temporary storage means comprised in the network terminal device, and activating the Operating System in the network terminal device as an Operating System of its own;
- transmitting the application data requested by the network terminal device from said second delivery server to the network terminal device in response to a request from the network terminal device for the transmission of the application data; and
- storing the application data in the temporary storage means, and activating an application included in the application data for running on the Operating System in the network terminal device.

4. A client/server system, comprising:
- a first delivery server that has Operating System data and application data previously stored therein;
- a second delivery server that is network-connected to the first delivery server, and is adapted to store the Operating System data and the application data received from the first delivery server in response to a predetermined request; and
- a network terminal device that is network-connected to the second delivery server, and is adapted to store boot information having described therein a procedure for receiving the Operating System data stored in the first delivery server, wherein the network terminal device is adapted to:
- receive the Operating System data from the first delivery server via the second delivery server based on the procedure described in the boot information in response to the predetermined request, and activate the Operating System based on the received Operating System data;
- receive the application data from the first delivery server via the second delivery server in response to the predetermined request, and activate the received application data on the Operating System; and
- activate and run the application data and the Operating System data as the Operating System of its own.

* * * * *